(12) United States Patent
Bouchuiguir et al.

(10) Patent No.: US 12,349,737 B2
(45) Date of Patent: Jul. 8, 2025

(54) AEROSOL GENERATION DEVICE WITH OPTICAL CODE DETECTOR

(71) Applicant: JT International SA, Geneva (CH)

(72) Inventors: Layth Sliman Bouchuiguir, Bellevue (CH); Patrice Borne, Publier (FR)

(73) Assignee: JT International S.A. (CH)

( * ) Notice: Subject to any disclaimer, the term of this patent is extended or adjusted under 35 U.S.C. 154(b) by 475 days.

(21) Appl. No.: 17/787,733

(22) PCT Filed: Dec. 14, 2020

(86) PCT No.: PCT/EP2020/086016
§ 371 (c)(1),
(2) Date: Jun. 21, 2022

(87) PCT Pub. No.: WO2021/122474
PCT Pub. Date: Jun. 24, 2021

(65) Prior Publication Data
US 2023/0077819 A1   Mar. 16, 2023

(30) Foreign Application Priority Data

Dec. 20, 2019   (EP) .................................... 19218739

(51) Int. Cl.
*A24F 40/51*   (2020.01)
*A24F 40/20*   (2020.01)
(Continued)

(52) U.S. Cl.
CPC .............. *A24F 40/51* (2020.01); *A24F 40/20* (2020.01); *A24F 40/40* (2020.01); *A24F 40/53* (2020.01);
(Continued)

(58) Field of Classification Search
None
See application file for complete search history.

(56) References Cited

U.S. PATENT DOCUMENTS 8,689,804 B2 * 4/2014 Fernando ........... G06V 30/2253
131/184.1
2017/0099873 A1   4/2017 Benjamignan et al.
(Continued)

FOREIGN PATENT DOCUMENTS

CN   103704886 A   4/2014
CN   206687163 U   12/2017
(Continued)

OTHER PUBLICATIONS

CN 206687163 English Translation (Year: 2017).*
(Continued)

*Primary Examiner* — Manley L Cummins, IV
(74) *Attorney, Agent, or Firm* — Lerner David LLP

(57) ABSTRACT

An aerosol generation device includes an optical code detector. More specifically, an aerosol generation device comprises: a casing defining an opening for insertion of an aerosol generation carrier; a heating chamber configured to partially contain the aerosol generation carrier such that at least a portion of the aerosol generation carrier extends outside the heating chamber; and an optical detection unit comprising an image detector arranged for optically detecting a code provided on a section of a surface of the portion of the aerosol generation carrier extending outside the heating chamber. The heating chamber is configured to heat a portion of the aerosol generation carrier inserted in the heating chamber.

21 Claims, 6 Drawing Sheets

(51) Int. Cl.
  *A24F 40/40*  (2020.01)
  *A24F 40/53*  (2020.01)
  *A24F 40/57*  (2020.01)
  *G06K 7/14*  (2006.01)

(52) U.S. Cl.
  CPC ............ *A24F 40/57* (2020.01); *G06K 7/1413* (2013.01); *G06K 7/1417* (2013.01)

(56) References Cited

U.S. PATENT DOCUMENTS

| | | | |
|---|---|---|---|
| 2019/0000144 A1* | 1/2019 | Bless | ................. A24F 40/46 |
| 2019/0261682 A1 | 8/2019 | Gimkiewicz et al. | |
| 2020/0154765 A1 | 5/2020 | Lee et al. | |

FOREIGN PATENT DOCUMENTS

| | | | |
|---|---|---|---|
| EP | 2201850 A1 | 6/2010 | |
| JP | 2018527894 A | 9/2018 | |
| KR | 20180114825 A | 10/2018 | |
| WO | WO-2016199066 A1 * | 12/2016 | ............. A24F 40/10 |
| WO | 2017029088 A1 | 2/2017 | |
| WO | 2019129378 A1 | 7/2019 | |
| WO | 2019185747 A1 | 10/2019 | |
| WO | 2019185749 A1 | 10/2019 | |
| WO | 2019186149 A1 | 10/2019 | |

OTHER PUBLICATIONS

CN 103704886 English Translation (Year: 2014).*
International Search Report for Application No. PCT/EP2020/086016 mailed Feb. 12, 2021, pp. 1-4.

* cited by examiner

AEROSOL GENERATION DEVICE WITH OPTICAL CODE DETECTOR

CROSS-REFERENCE TO RELATED APPLICATIONS

The present application is a national phase entry under 35 U.S.C. § 371 of International Application No. PCT/EP2020/086016, filed on Dec. 14, 2020, published in English, which claims priority from European Application No. 19218739.1, filed on Dec. 20, 2019, the disclosures of which are incorporated herein by reference.

TECHNICAL FIELD

The present invention relates to an aerosol generation device with an optical code detector.

BACKGROUND

An aerosol generation device, or E-cigarette, is now a mainstream product to simulate a traditional tobacco cigarette. There are many types of aerosol generation devices, and the one which still has tobacco inside is one of the most popular types. The advantage of this type of aerosol generation device is that the user is still smoking tobacco, which means the smoking perception resembles the traditional cigarette. Besides, with the way of heating but not burning the article, the aerosol generation device does not release the by-products of combustion such as tar and carbon monoxide. The operation method of the aerosol generation device is to contain an aerosol generation carrier inside and to heat it, but not to its burning point. There is also another type of E-cigarette, the operation method of which is to evaporate liquid to form smoke. For both types of aerosol generation devices, especially the one with substrate inside, a high-quality carrier is important. Hence, the authentication of the aerosol generation carrier (also referred to as consumable or smoking article, such as a "stick") is important to guarantee the origin of the products for safety and health reasons. Furthermore, a proper setting of the operation parameters such as heating the carrier at a matching temperature is also important for delivering a pleasing aerosol taste. The optimal parameter settings also depend on the type of consumable and substrate composition (tobacco blend, flavor, aerosol formers, etc.).

WO 2017/029088 relates to an electrically operated smoking device configured to receive a smoking article, comprising: a housing defining a cavity for at least partially receiving a smoking article and a sensing system for detecting indicia on the smoking article. The sensing system is positioned on a periphery of the cavity and comprises a light source, a mirror, an imaging lens and an image detector, wherein the mirror is positioned on an internal surface of the cavity adjacent to the light source and the imaging lens. The provision of a mirror on an internal surface of the cavity allows for a wide field of view to be imaged in a small space. However, the disclosed device requires a larger cavity for accommodating for the mirror, and the mirror can become soiled.

EP 2 201 850 relates to a smoking article, including identification information encoded on the smoking article. The article is configured for use with an electrically heated smoking system having a detector for detecting the smoking article and distinguishing the smoking article from other articles, based on the identification information. However, the detector can become soiled, and the heat of the cavity may affect the detector.

WO 2019/185747 discloses an apparatus including a heating chamber used to heat an article partially placed into the heating chamber. The apparatus further includes a sensor arrangement that reads a marker/indicium present in the article. However, when the sensor arrangement reads the maker/indicium on the article, the sensor is exposed to the heating from the heating chamber, and the sensor arrangement increases the size of the device.

Therefore, there is a need for an improved aerosol generation system which allows authentication of an aerosol generation carrier which avoids the problems of the prior art, and an aerosol generation carrier having coded information which can be used with the improved aerosol generation system.

SUMMARY OF THE INVENTION

The present invention provides an aerosol generation device with an optical code detector which solves some or all of the above problems.

A 1st embodiment of the invention is directed to an aerosol generation device, comprising: a casing defining an opening for insertion of an aerosol generation carrier; a heating chamber configured to partially contain the aerosol generation carrier such that at least a portion of the aerosol generation carrier extends outside the heating chamber, and to heat a portion of the aerosol generation carrier inserted in the heating chamber; and an optical detection unit comprising an image detector, arranged for optically detecting a code provided on a section of a surface of the portion of the aerosol generation carrier extending outside the heating chamber.

With this arrangement of the image detector, a code can be optically detected which is provided on the section of the aerosol generation carrier which remains outside of the heating chamber. This arrangement has the advantage that the optical detection unit can be arranged in more accessible, less confined locations as well as less exposed to changing physical conditions, thus allowing for a simpler, more reliable and more accurate optical unit design. This further can have the effect that the optical detection unit will not be affected by the heat or dirt generated inside the heating chamber during the consumption of aerosol by the user. The arrangement is less prone to deformation, condensation or other possible alteration generated by heat and/or vapor. Also, the coded information of the aerosol generation carrier can be detected even after long time use or after use for multiple times.

According to a 2nd embodiment, in the 1st embodiment, the optical detection unit is configured to receive light through an optical aperture formed in a component of the aerosol generation device, the optical aperture being located outside the tubular heating chamber. This arrangement allows in a simple manner that the optical detection unit can detect a code provided on a section of the aerosol generation carrier which is located outside of the tubular heating chamber.

According to a 3rd embodiment, in the 2nd embodiment, the optical aperture is located above the heating chamber, when the aerosol generation device is held such that the insertion direction of the aerosol generation carrier is from top to bottom.

According to a 4th embodiment, in any one of the 2nd or 3rd embodiments, the component in which the optical aperture is formed is made of a material having a lower thermal conductivity than the material which forms an inner surface of the tubular heating chamber. This arrangement allows heat to transfer at a lower rate into the component so that the optical detection unit is safer to use, and the durability is improved.

According to a 5th embodiment, in any one of the 2nd to 4th embodiments, the optical aperture is closed by a transparent material, preferably plastic or glass. This arrangement is an additional measure to prevent that the optical detection unit becomes soiled, or the heat of the cavity affects the optical detection unit.

According to a 6th embodiment, in any one of the 2nd to 5th embodiments, the optical aperture is positioned at an outer surface of the casing, outside the insertion opening. This arrangement allows the optical detection unit being able to detect the code with fewer components to be installed. It is able to use environmental light for the detection, hence improve the battery life of the aerosol generation device.

According to a 7th embodiment, in any one of the previous embodiments, the aerosol generation device comprises a cavity which optically links the optical aperture to the image detector.

According to an 8th embodiment, in any one of the previous embodiments, the aerosol generation device comprises a light source which is configured to illuminate the code on a surface of the maximally inserted aerosol generation carrier such that the light is reflected by the code to the image detector.

According to a 9th embodiment, in any one of the 7th and 8th embodiments, the light source is located inside the cavity.

According to a 10th embodiment, in any one of the 7th to 9th embodiments, a mirror is positioned in the cavity such that it reflects the light reflected by the code to the image detector.

According to an 11th embodiment, in the 10th embodiment, the mirror is configured to change the direction of the light in an angle of at least 45°, preferably at least 60°, more preferably at least 70°, and most preferably at least 80°.

According to a 12th embodiment, in any one of the 7th to 11th embodiments, one end of the cavity is positioned between the insertion opening and the tubular heating chamber. This arrangement can not only have the effect that the optical detection unit will not be affected by the heat or dirt generated inside the heating chamber, but also not easy to be soiled by the dirt from outside of the device and protects the transparent material closing the optical aperture from scratch in daily use.

According to a 13th embodiment, in any one of the 7th to 12th embodiments, the image detector is positioned below the opening of the tubular heating chamber through which the aerosol generation carrier is inserted into the tubular heating chamber, preferably below the entire tubular heating chamber, when the aerosol generation device is held such that the insertion direction of the aerosol generation carrier is from top to bottom. This arrangement can not only have the effect of avoiding the damage of the heat from the heating chamber but it allows to reduce the size of the device and simplify the inner structure of the circuit configuration in the device, since the image detector is set in the space where it has fewer components is and closer to the controller. The image detector can so be integrated with the other electronic components of the device, which are set in the bottom of the device, such as with the controller, such as PCB or CPU, of the aerosol generation device.

According to a 14th embodiment, in any one of the previous embodiments, the aerosol generation device comprises a closure, the closure is configured to move between a closing position of the insertion opening and an opening position of the insertion opening.

According to a 15th embodiment, in the previous embodiment, the optical detection unit is activated when the closure is moved from the closing position to the opening position or is moved from any one of the closing position and opening position to an activation position and/or when the aerosol generation carrier is maximally inserted to the tubular heating chamber.

According to a 16th embodiment, in the previous embodiment, the optical detection unit is activated by clicking the closure of the aerosol generation device.

According to a 17th embodiment, in any one of the 14th to 15th embodiments, the optical detection unit is activated for a predetermined time after the closure is slid into the activation position or open position.

According to an 18th embodiment, in any one of the 14th to 17th embodiments, the optical aperture is positioned in a front end of the closure.

According to a 19th embodiment, in the 6th embodiment and any one of the 14th to 18th embodiments, the closure is configured to cover the optical aperture when the closure is in the closing position, and to expose the optical aperture to the section of the portion of the aerosol generation carrier where the code is provided when the closure is moved to the opening position.

According to a 20th embodiment, in any one of the 13th to 19th embodiments, the optical detection unit is activated when the closure is moved to trigger a Hall sensor, a tact switch, an infrared or proximity sensor or an electrical contact sensor.

According to a 21st embodiment, in any one of the previous embodiments, the aerosol generation device is configured to, based on an image detected by the optical detection unit, identify and/or authenticate the aerosol generation carrier, carry out a program of a data retrieval protocol and/or set a device setting.

According to a 22nd embodiment, in any one of the previous embodiments, the device setting comprises setting a heating profile, a duration, a number of puffs and/or a ventilation ratio to apply for a user.

According to a 23rd embodiment, in any one of the previous embodiments, the image detector is a camera, preferably a CCD or CMOS camera.

According to a 24th embodiment, in any one of the previous embodiments, the tubular heating chamber is activated to heat the aerosol generation carrier after the code has been processed by the aerosol generation device.

According to a 25th embodiment, in any one of the previous embodiments, the tubular heating chamber stops heating the aerosol generation carrier after an instruction from the aerosol generation device has been sent to the tubular heating chamber and by processing the code.

According to a $26^{th}$ embodiment, the invention relates to a system comprising an aerosol generation device as aforementioned and an aerosol generation carrier on which the code is provided, wherein the code is located outside of the tubular heating chamber when the aerosol generation carrier is maximally inserted.

In particular, the code is affixed to a portion of the wrapper of the aerosol generation carrier. Preferably, the code is affixed onto the wrapper portion at the mouth end in the first third, preferably the first quarter of the axial dimension of the aerosol generation carrier.

With the preferred embodiments, the structure of the aerosol generation device in simplified, the aerosol generation device is downsized, and the durability of the aerosol generation is improved.

A 27th embodiment of the invention is directed to an operation method of an aerosol generation device according to any one of the preceding embodiments, the operation method comprising the step of: detecting a code provided on a section of a surface of the portion of the aerosol generation carrier extending outside a heating chamber comprised by the aerosol generation device, via an optical detection unit comprised by the aerosol generation device.

Preferred embodiments are now described, by way of example only, with reference to the accompanying drawings.

DETAILED DESCRIPTION

Preferred embodiments of the present invention are described hereinafter and in conjunction with the accompanying drawings.

Figure 1:
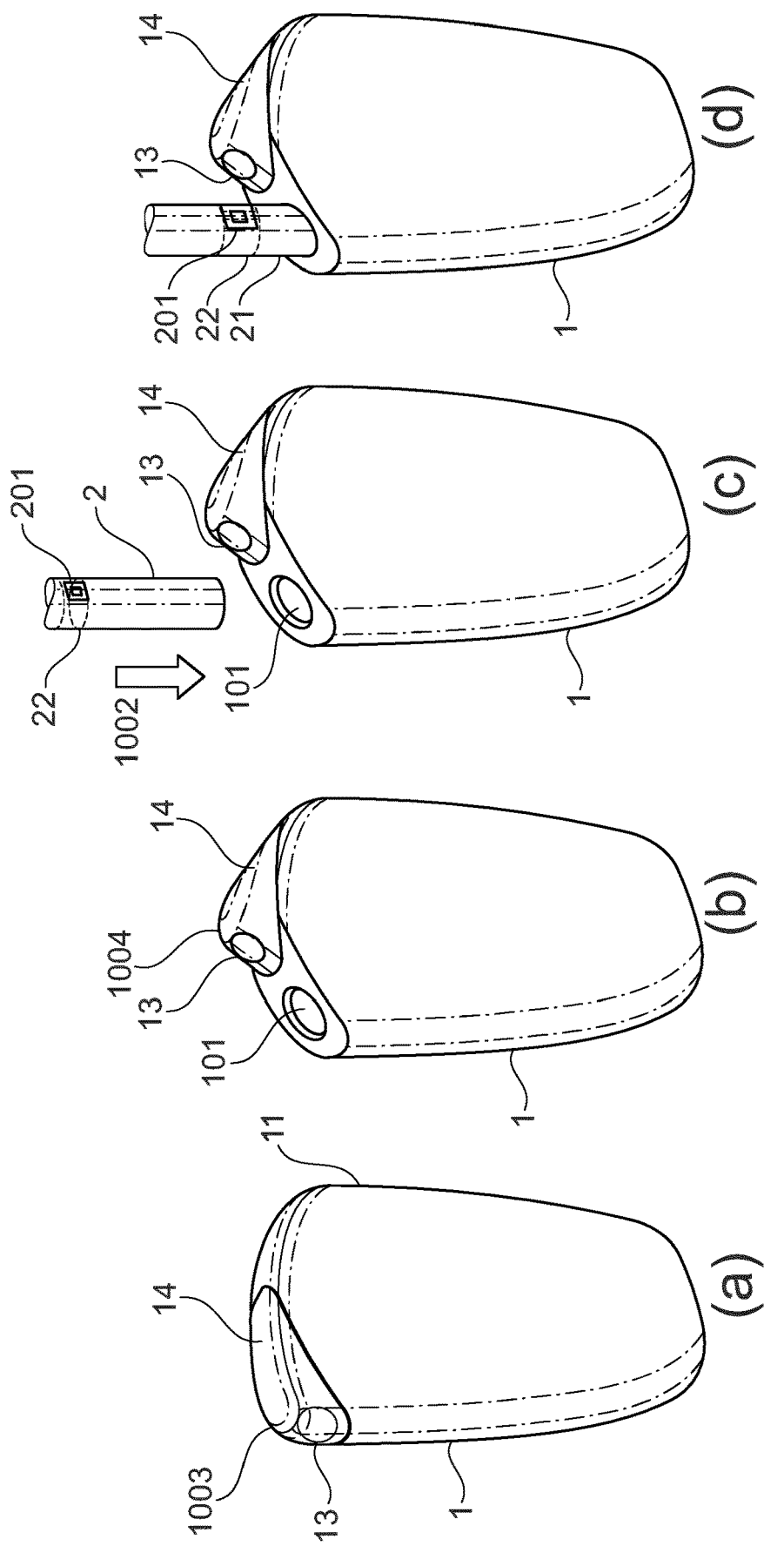
FIG. 1(a) is a schematic diagram of a first embodiment of an aerosol generation device according to the invention, where a closure of the aerosol generation device is in a closed position.
FIG. 1(b) is a schematic diagram of the first embodiment of the aerosol generation device, where the closure is in an open position.
FIG. 1(c) is a schematic diagram of the first embodiment of the aerosol generation device, where the closure is in an open position and an aerosol generation carrier to be inserted therein.
FIG. 1(d) is a schematic diagram the first embodiment of the aerosol generation device, where the closure is in an open position and the aerosol generation carrier is inserted therein.

Referring to FIG. 1, according to a first embodiment of the invention, an aerosol generation device 1 comprises a casing 11 housing various components of the aerosol generation device 1. The casing 11 can be of any shape so long as it is sized to fit the components described in the aerosol generation device 1. The casing 11 can be formed of any suitable material, or indeed layers of material.

A first end of the aerosol generation device 1 that is an end near to a closure 14 of the aerosol generation device 1 is described herein as the top or top end of the aerosol generation device 1. A second end of the aerosol generation device 1 that is an end away from the closure 14 is described herein as a bottom or bottom end of the aerosol generation device 1. Movement from the top of the aerosol generation device 100 to the bottom of the aerosol generation device 1 is described herein as down, while movement from the bottom of the aerosol generation device 1 to the top of the aerosol generation device 1 is described herein as up. During use, the user typically orients the aerosol generation device 1 with the first end downward and/or in a distal position with respect to the user's mouth, and the second end upward and/or in a proximate position with respect to the user's mouth.

An aerosol generation carrier 2 is inserted along the insertion direction 1002 into the opening 101 defined by the casing at the top of the device, as shown in FIG. 1(c), from top to bottom of the aerosol generation device 1. The aerosol generation carrier comprises an aerosol generation substrate, which may include a tobacco material in various forms such as shredded tobacco and granulated tobacco, and/or the tobacco material may include tobacco leaf and/or reconstituted tobacco such as sheets, strips and foam, if it is suitable for a t-vapor.

A tubular heating chamber 12 is set inside the aerosol generation device 1 communicating with the opening 101. The tubular heating chamber 12 may comprise any type of heater that is suitable to heat the aerosol generating substrate of the aerosol generation carrier 2 directly or indirectly. For example, the tubular heating chamber 12 may comprise a film heater comprising an electrically-conductive heating track for resistive heating, and one or more base layers, including an insulating material. The insulating material may be a resin material such as polyimide, silicone and/or PEEK.

When in use, as shown in FIG. 1(d), the tubular heating chamber 12 only partially contains the aerosol generation carrier 2 when maximally inserted, i.e. when the aerosol generation carrier 2 is attached to the aerosol generation device 1 for consumption, namely, when in use. In a preferred embodiment, the heating chamber only heats the aerosol generation carrier 2 after being maximally inserted, and the user consumes the aerosol generation device 1 and the aerosol generation carrier 2 in this condition.

The aerosol generation device 1 further comprises an optical detection unit 13. The optical detection unit 13 is located in the casing 11 and/or physically attached to the aerosol generation device 1, and more specifically is located in a front end of the closure 14. The front end of the closure is an end of the closure which is close to and at least partially faces towards to the axial direction of the insertion opening 101, more specifically faces towards a surface of the aerosol generation carrier when in consumption. The surface is preferably the surface of the wrapper of the carrier 2.

Even more specifically, the optical detection unit 13 faces and optically detects a code 201 provided on a section 22 of a surface 21 of a portion of a maximally inserted aerosol generation carrier. With the optical detection unit 13 being positioned in the closure 14, the main body of the aerosol generation device 1 is downsized and the structure of the device 1 is also simplified.

The code 201 is located outside of the tubular heating chamber 12 when the aerosol generation carrier 2 is maximally inserted. As shown in FIGS. 1(c) and (d), the code 201 is in the section 22 outside the tubular heating chamber 12 and the aerosol generation device 2, so that the code which is printed on the carrier 2 can be printed by most of the known ink or material available in the market, because the ink or material does not need to bear the heat or be soiled by the dirt from the aerosol generation device 1, so that the code 201 will not fade away even after long time use, and still can be detected after multiple uses. The outside section 22 can be the entire longitude surface outside the heating chamber 12 or just a surrounding section around the surface, which can be optically attached by the optical detection unit 13 when the code 201 faces the optical detection unit 13. The figures are only schematic diagrams. For example, in FIG. 1(*d*), although it is not shown specifically, it should be understood that the code 201 is turned towards the optical detection unit 13 when the optical detection unit 13 detects the code 201. In general, the code 201 is configured in the way that the optical detection unit 13 is arranged for optically detecting the code 201 provided on a section of a surface of the portion of the aerosol generation carrier 2 extending outside the heating chamber when or as another portion of the carrier is inserted in the heating chamber 12.

The code 201 is represented by at least one machine-readable optical pattern, such as a barcode, a QR code, dots, or an image.

The optical detection unit 13 comprises an image detector 103. The image detector may be a camera unit, such as a CCD or CMOS camera. In another preferred embodiment, the image detector may be an optical scanner.

The optical detection unit 13 is used to detect a code which can be used for the authentication of the aerosol generation carrier 2. In a more preferred embodiment, the optical detection unit 13 is configured to, based on an image detected by the optical detection unit 13, identify and/or authenticate the aerosol generation carrier, carry out a program of a data retrieval protocol and/or set a device setting. The detection arrangement of the optical detection unit 13, which is in turn connected to the device controller embedding an authentication intelligence (software+processor/ASIC, for example) and the battery is turned on upon reaching a predetermined position in the opening. Once the aerosol generation carrier is inserted in the chamber or during its insertion into the chamber, the detection systems reads an authentication component/area of the aerosol generation device to carry out the authentication or data retrieval protocol. The gathered image/signal is processed by the authentication intelligence to determine if the aerosol generation carrier 2 is authentic, what type of carrier 2 it is, and which device settings (e.g. heating profile, heating duration, puff count, ventilation ratio) to apply for proper usage by the user. The code can be repeated on the circumference to provide a reliable reading.

As shown in FIG. 1(*b*), the aerosol generation device 1 is activated by opening the closure. More specifically, the optical detection unit 13 is activated when the closure 14 is moved from the closing position to the opening position or is moved from any one of the closing position 1003 and opening position 1004 to an activation position 1005 and/or when the aerosol generation carrier 2 is maximally inserted into the tubular heating chamber 12. The optical detection unit 13 is activated when the closure 14 is moved to trigger a Hall sensor, a tact switch, an infrared or proximity sensor or an electrical contact sensor. Although not shown in the figures, the optical detection unit 13 may also be activated by the carrier 2 touching a tact switch positioned on an inner wall, e.g. at the bottom, of the heating chamber or in the vicinity of the insertion opening.

Figure 3A:
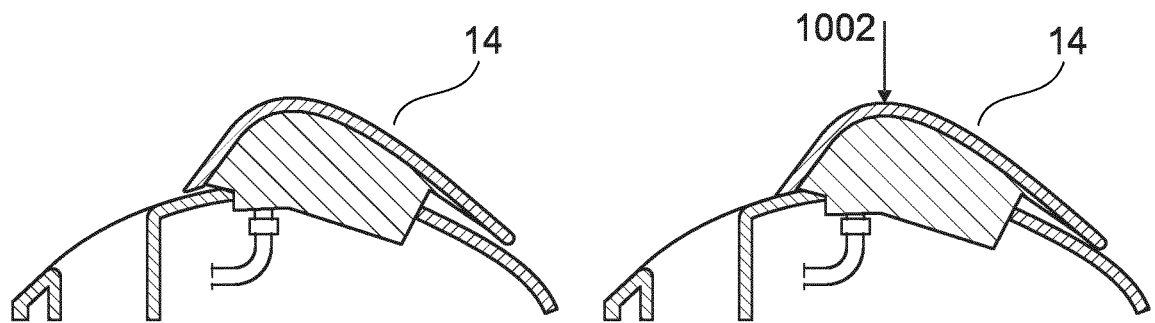
FIG. 3(a) is a schematic cross-sectional view from the side of one embodiment of an aerosol generation device having a closure.
Figure 3B:
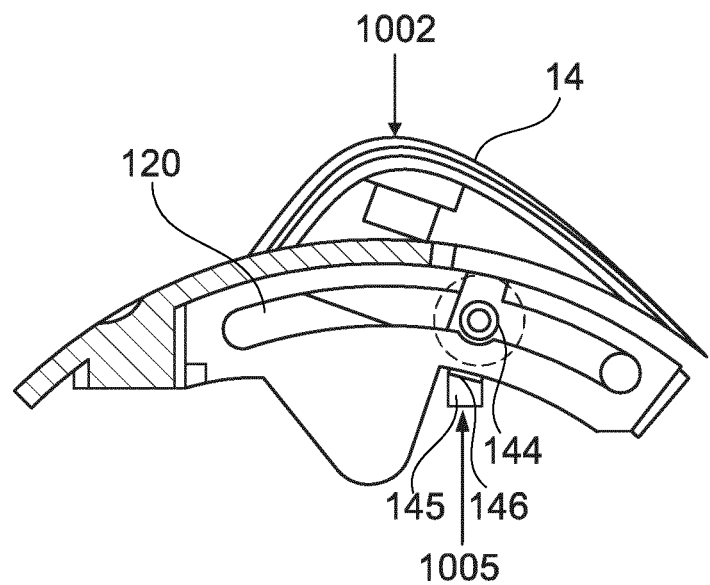
FIG. 3(b) is a schematic cross-sectional view from the side of another embodiment of an aerosol generation device having a closure.

FIGS. 3(*a*) and 3(*b*) are schematic cross-sectional views from the side of two embodiments of the closure.

In FIG. 3(*a*), the aerosol generation device 1 is activated by manually actuating the closure 14, e.g. pushing, pulling, pressing or clicking the closure 14. The tact switch below the bottom of the closure is turned on or off by the clicking in an insertion direction 1002, and the tact switch can be switched at the closing position 1004 of the closure 14.

In another embodiment as shown in FIG. 3(*b*), the aerosol generation device 1 is activated by sliding the closure through a screw 144 on a slide track 120. A sliding element 146 connects with the screw 144 and slides through an electrical contact sensor 145 at an activation position 1005 to activate the process of code detection.

The activation position 1005 can be the same as the closing position 1004 or a position close to the opening position 1003 or any position between the opening position 1003 to the closing position 1004, or a position behind the opening position, where the closure will be bounced back by a spring in the device 1 to the opening position 1003. Therefore, detection operation can be activated from the closing position to the opening position or from any one of the closing position 1003 and opening position 1004 to an activation position 1005 and/or when the aerosol generation carrier 2 is maximally inserted into the tubular heating chamber 12. Although only some embodiments are given herein, it is known to the skilled person that any kind of known sensor or switch can be used, or any kind of activation method applied in the known aerosol generation device can be used. It is conceivable by the skilled person that the closure 14 may be arranged to rotate between the closing position 1004 and the opening position 1003; in these embodiments, the rotation may be in any plane, and the activation thereof is triggered by the rotation movement of the closure 14.

A method of operation of the aerosol generation device 1 is illustrated in FIG. 1(*a*) to 1(*c*). As shown in FIG. 1(*a*), the aerosol generation device 1 is switched off when the closure 14 is in the closing position 1003. Then, as shown in FIG. 1(*b*), the user slides the closure to the opening position 1004, which triggered an electrical contact sensor locating close to the opening position 1004. The optical detection unit 13 is therefore activated by the sliding motion. As shown from FIG. 1(*c*) to 1(*d*), the carrier 2 is inserted into the heating chamber 12 through the insertion opening 101 in the aerosol generation device 1 along the insertion direction 1002 into a position in which the carrier 2 is maximally inserted, up until the bottom of the heating chamber 12. The code 201 may be repeatedly printed around the surface of the tubular carrier 2, or the user needs to turn the tubular carrier 2 around so that code 201 printed on the outside section 22 of the tubular carrier 2 faces the optical detection unit 13. The code 201 provided on the section of the surface of the portion of the aerosol generation carrier 2 extending outside the heating chamber is detected via the optical detection unit 13. Once the optical detection unit 13 detects the code 201, as shown in FIG. 1(*d*), a signal is transferred to the device controller, and the relevant data is analyzed by the software installed in the device 1 to authenticate the carrier 2. In a preferred embodiment, the detector is only activated in a predetermined limited time period, such as 1 s, more preferably, 0.5 s, even more preferably 0.1 s, the most preferable 0.01 s, so as to save the battery life of the device. Once the authentication of the carrier 2 is secured, the controller of the device sends an instruction to the heating chamber 12 to start heating the carrier 2. To increase reliability, the authentication may also be repeated at a short predetermined time interval(s) and optionally compared by the control unit of the device. In a preferred embodiment, the code may also determine a device setting, such as heating profile, duration, number of puffs, ventilation ratio to apply for proper usage by the user. In an embodiment, the code 201 includes data about the duration and/or the maximal number of puffs. Therefore, after a predetermined time, such as around 30 s, more preferably around 20 s, even more preferably around 15 s, most preferably around 10 s, and/or after a maximal number of puffs reached, such as 10, 15 or 20 puffs, the heating chamber 102 stops heating the carrier 2. The heating chamber 102 may be stopped after a first event is reached amongst a duration or a maximal number of puffs. A heating profile may be coded by data containing information related to temperatures as a function of time. For example, one or more temperature set points may be stored as data. Each temperature set point may be associated to data related to time such as a time period during which a sensed temperature is compared to the temperature set point, such as by PID control. Instead of coding parameters, the coded data may refer to a lookup table, providing the parameter set points or profiles and which is stored in a memory of a controller of the device.

Figure 2:
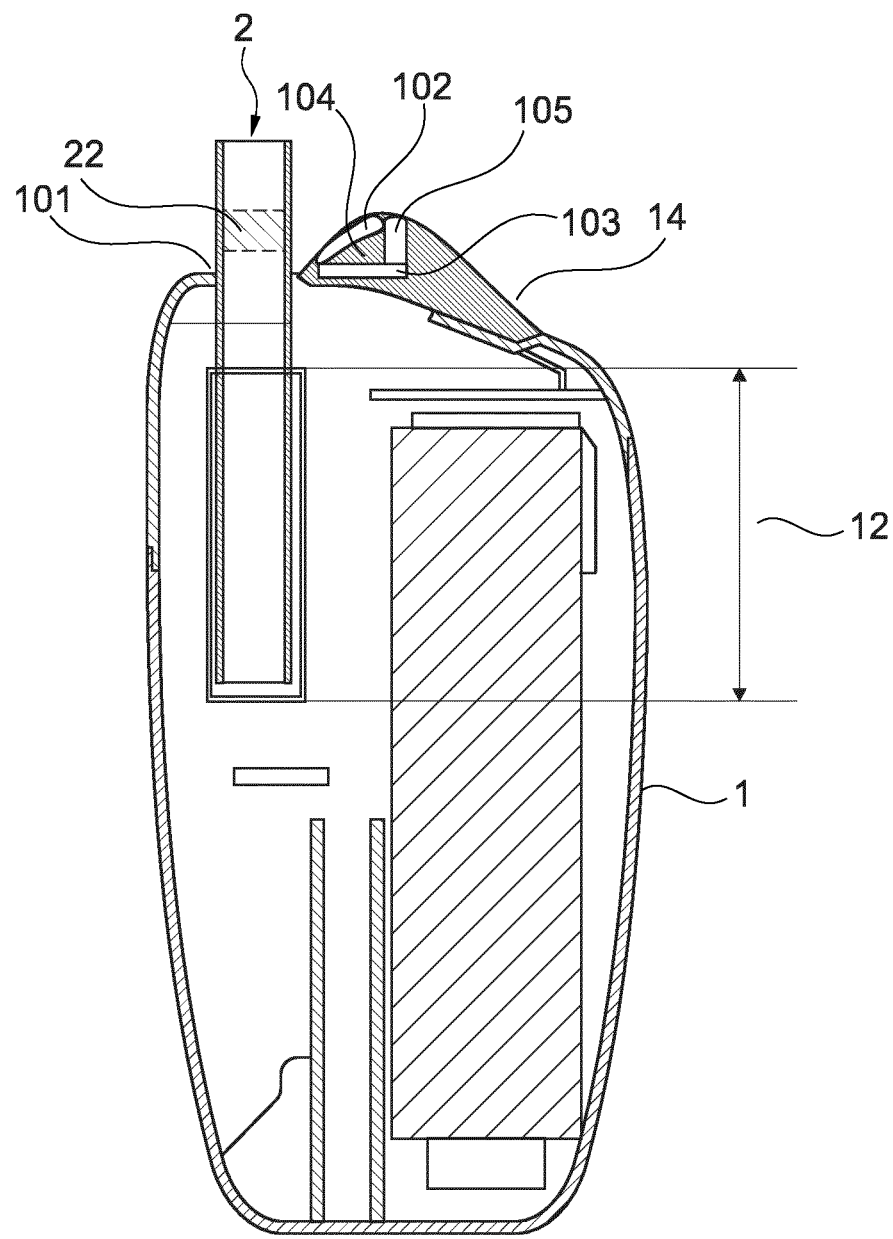
FIG. 2 is a schematic cross-sectional view of the first embodiment of the aerosol generation device.

FIG. 2 is a schematic cross-sectional view of the first embodiment of the aerosol generation device 1 according to the invention. The optical detection unit 13 connects to a PCB and the controller of the device and is powered by the battery of the device 1 (not shown). The optical detection unit 13 is closed by an optical aperture 102, which is sealed or closed by a window. The window is made of a transparent material, such as glass or more preferably plastic. The optical detection unit 13 comprises a light source 105, e.g. an LED, and the image detector 103 in a cavity 104. The light source 105 is configured to illuminate the code on a surface 21 of the maximally inserted aerosol generation carrier 2 such that the light is reflected by the code 201 to the image detector 103 completely. In a preferred embodiment, the image detector 13 is firstly activated to detect the environmental lightness in front of the optical detection unit 13. If the lightness is below a certain threshold, which makes the optical detection unit 13 not being able to detect the code 201 on the outside section 22, the device switches on the light source 105.

Figure 4:
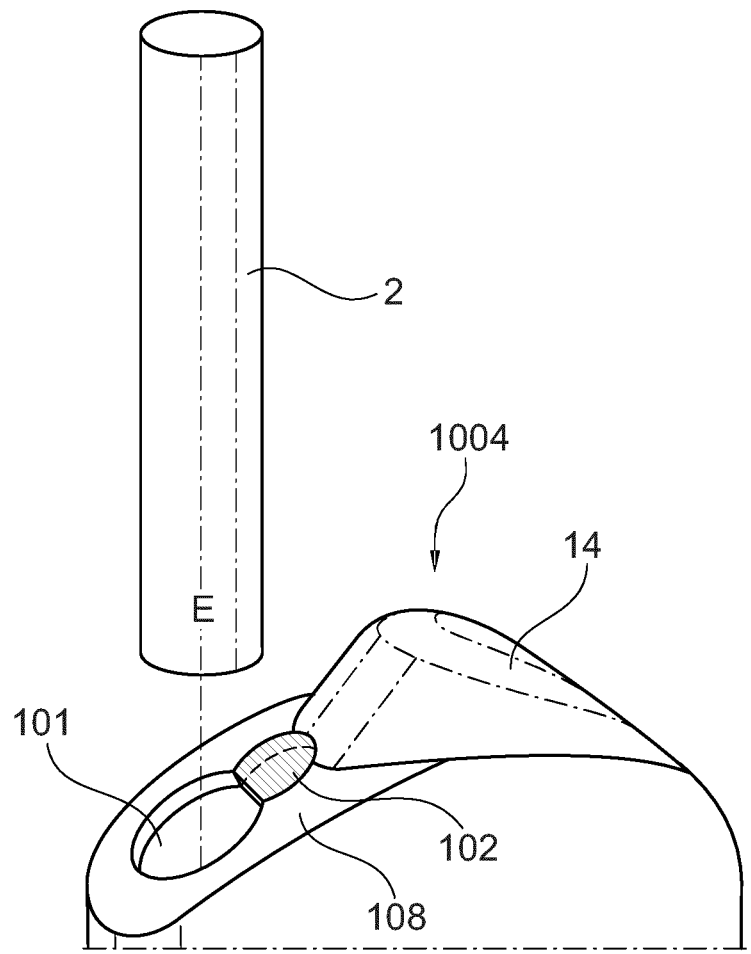
FIG. 4 is a schematic diagram of a second embodiment of an aerosol generation device according to the invention.

FIG. 4 is a schematic diagram of a second embodiment of an aerosol generation device according to the invention, wherein the optical aperture 102 is positioned at an outer surface 108 of the casing 11, outside the insertion opening 101. The outer surface 108 is located at the top of the device 1, and defines the insertion opening 101. The outer surface 108 can be a separate surface on the top of the casing 11 separated from or integrated with the other surfaces of the casing 11. The outer surface 108 has a curvature so that the optical aperture therein at least partially faces the axial direction of the insertion opening 101, more specifically faces a surface of the aerosol generation carrier when in consumption and is described herein. The optical aperture 102 transmitting the light reflected by the code to the image detector (not shown) is located adjacent to the insertion opening 101. The closure 14 is configured to cover the optical aperture 102 when the closure 14 is in the closing position 1003, and to expose the optical aperture 102 to the section 22 of the portion of the aerosol generation carrier 2 where the code 201 is provided when the closure 14 is moved to the opening position 1004.

Figure 5A:
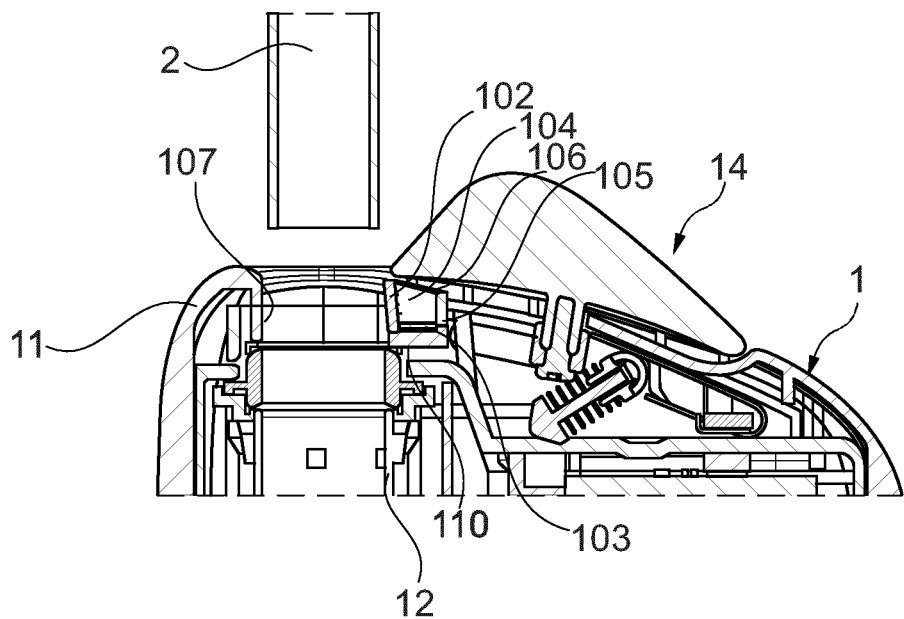
FIG. 5(a) is a schematic cross-sectional view of a third embodiment of the aerosol generation device according to the invention, with the aerosol generation carrier to be inserted therein.
Figure 5B:
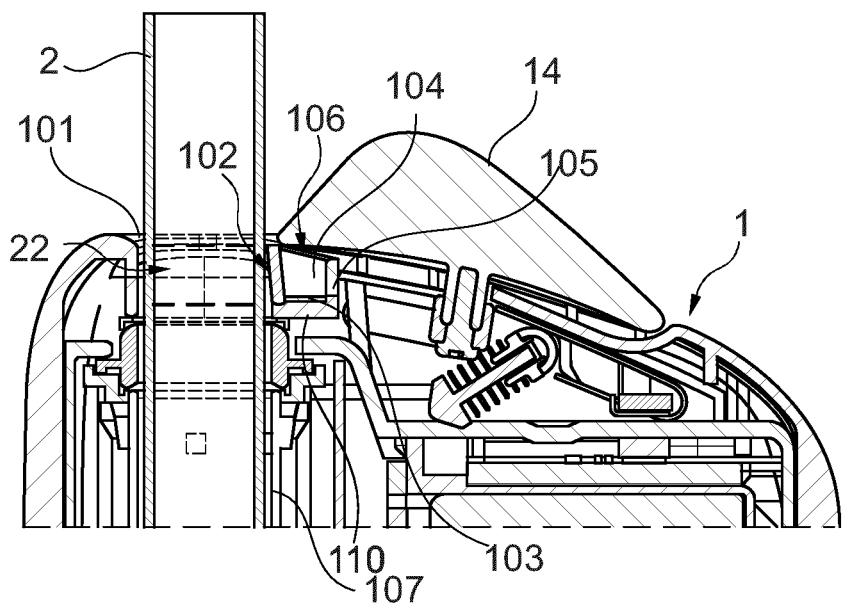
FIG. 5(b) is a schematic cross-sectional view of the third embodiment of the aerosol generation device, with the inserted aerosol generation carrier.

FIG. 5(a) is a schematic cross-sectional view of a third embodiment of the aerosol generation device according to the invention, with the aerosol generation device to be inserted therein. FIG. 5(b) is a schematic cross-sectional view of the third embodiment of the aerosol generation device 1 with the inserted aerosol generation device 1. The optical aperture 102 is positioned between the insertion opening 101 and the tubular heating chamber 12. The optical aperture 102 communicates with the image detector 15 through the cavity 104. In other words, one end of the cavity 104 is positioned between the insertion opening 101 and the tubular heating chamber 12. Specifically, one end of the cavity 104 is positioned between the insertion opening 101 and the tubular heating chamber 12. The optical detection unit 13 is configured to receive light through the optical aperture 102 formed in a component of the aerosol generation device 1. More specifically, the optical aperture 102 covers one end of the cavity 104 and is positioned and formed in a component, a ring element in the aerosol generation device 1, which connects the insertion opening 101 and the opening of the tubular heating chamber 12. Hence, the optical aperture is located above the heating chamber 12, when the aerosol generation device 1 is held such that the insertion direction of the aerosol generation carrier 2 is from top to bottom. With such a position, the optical aperture 102 optically covers the code printed on the outside section 22, which is positioned on the corresponding area on the surface of the carrier 2. A mirror transmits the light reflected from the code 201 to the image detector 103. The component, in which the optical aperture 102, covered by a material such as glass or plastic, is formed, is made of a material having a lower thermal conductivity than the material, which forms an inner surface of the tubular heating chamber, and more precisely, the material of the component in which the optical aperture 102 has a thermal conductivity less than 0.25 Wm-1K-1, preferably 0.2 Wm-1K-1, more preferably 0.15 Wm-1K-1, even more preferably 0.1 Wm-1K-1, the most preferably 0.01 Wm-1K-1. In a preferred embodiment, the component in which the optical aperture 102 is formed is made of a material having a lower thermal conductivity than the material which forms an inner surface of the ring elements which surrounds the optical aperture 102. The material of the heating chamber is preferably a metal such as stainless steel or aluminum. The component for the optical aperture is preferably heat resistant plastic such as polyamide or PEEK. The optical aperture 102 can have a round, a square or any other suitable shape. The component may also be coated or covered by a material reflecting heat such as a thin layer of metal. In this embodiment, the optical detection unit 13 further comprises a mirror 106 positioned in the cavity 104, so that it can reflect the light reflected from code 201 to the image detector 105. The mirror 106 is configured to change the direction of the light in an angle 1006 of at least 45°, preferably at least 60°, more preferably at least 70°, and most preferably at least 80°. The optical detection unit 13 is attached close to a heat insulating collar 110, so that the heat from the heating chamber 12 can be insulated, and the durability of the optical detection unit 13 can be prolonged.

Figure 6:
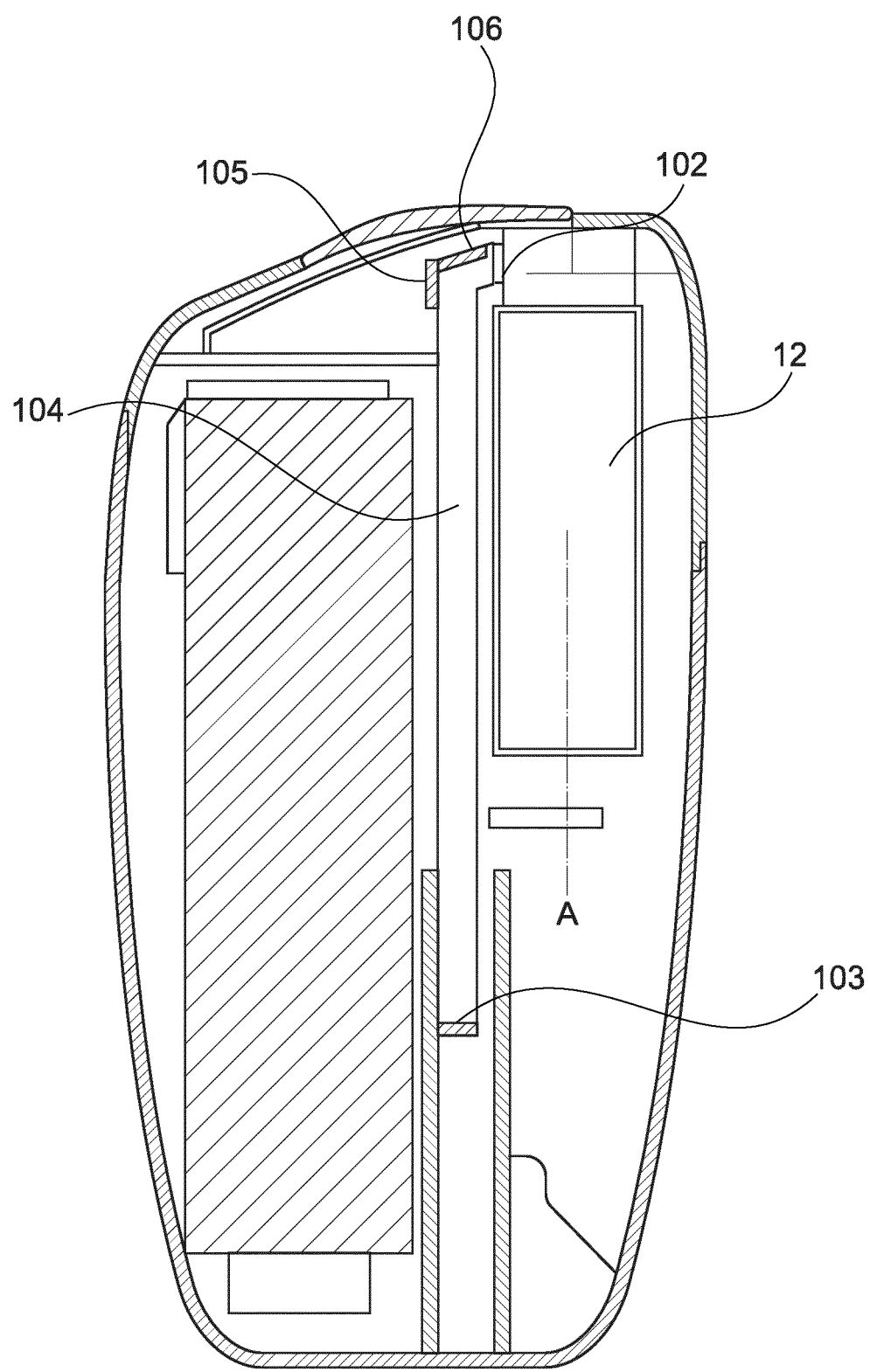
FIG. 6 is a schematic cross-sectional view of a fourth embodiment of the aerosol generation device according to the invention.

FIG. 6 is a schematic cross-sectional view of a fourth embodiment of the aerosol generation device according to the invention, based on the third embodiment (FIG. 5). The image detector is positioned below the opening of the tubular heating chamber 12 through which the aerosol generation carrier 2 is inserted into the tubular heating chamber 12, preferably below the entire tubular heating chamber 12, when the aerosol generation device 1 is held such that the insertion direction of the aerosol generation carrier 2 is from top to bottom. Specifically, the cavity is extended so that the image detector 103 is placed further remote from the window of the optical aperture 102 in the bottom of the device 1. The arrangement of the image detector 103 in the bottom of the device 1 can integrate the image detector 103 with the controller of the device 1, and further protect the image detector 103 from the heat and the dirt coming from the heating chamber.

It should be understood that all the optical detection units 13 in the embodiments are configured in a way that the glass or the plastic formed in the optical aperture 102 may be a lens that can adjust the angle of the light so that the light reflected by the code can be transmitted to the image detector for detection. It can also be understood that, although the optical detection unit 13 in some embodiments may not show the mirror 106 included in its schematic diagram, the mirrors 13 may be arranged therein so that the light reflected by the code can be reflected to the image detector for detection.

LIST OF REFERENCE SIGNS USED IN THE DRAWINGS (1) aerosol generation device
(2) aerosol generation carrier
(11) casing
(12) tubular heating chamber
(13) optical detection unit
(14) closure
(101) insertion opening
(102) optical aperture
(103) image detector
(104) cavity
(105) light source
(106) mirror
(107) inner surface
(108) outer surface
(109) PCB
(110) separate heat insulating collar
(120) slide track
(144) screw
(145) electrical contact sensor
(146) sliding element
(1002) insertion direction
(1003) closing position
(1004) opening position
(1005) activation position
(1006) angle
(21) surface
(22) outside section
(201) code

The invention claimed is:

1. An aerosol generation device, comprising:
a casing defining an insertion opening for insertion of an aerosol generation carrier;
a heating chamber configured to partially contain a first portion of the aerosol generation carrier such that at least a second portion of the aerosol generation carrier extends outside the heating chamber, the heating chamber configured to heat the first portion of the aerosol generation carrier inserted in the heating chamber; and
an optical detection unit comprising an image detector arranged for optically detecting a code provided on a section of a surface of the second portion of the aerosol generation carrier extending outside the heating chamber, wherein the optical detection unit is configured to receive light through an optical aperture formed in a component of the aerosol generating device, the optical aperture being located outside the heating chamber.

2. The aerosol generation device according to claim 1, wherein the optical aperture is located above the heating chamber, when the aerosol generation device is held such that an insertion direction of the aerosol generation carrier is from top to bottom.

3. The aerosol generation device according to claim 1, wherein the component in which the optical aperture is formed is made of a material having a lower thermal conductivity than the material which forms an inner surface of the heating chamber, and wherein the optical aperture is closed by a transparent material.

4. The aerosol generation device according to claim 1, wherein the aerosol generation device comprises a cavity which optically links the optical aperture to the image detector.

5. The aerosol generation device according to claim 4, comprising a light source configured to illuminate the code on the surface of the aerosol generation carrier when the aerosol generation carrier is maximally inserted into the insertion opening, such that light is reflected by the code to the image detector, wherein the light source is located inside the cavity.

6. The aerosol generation device according to claim 4, wherein a mirror is positioned in the cavity such that the mirror reflects the light reflected by the code to the image detector, and wherein the mirror is configured to change the direction of the light reflected by the code by an angle of at least 45°.

7. The aerosol generation device according to claim 4, wherein one end of the cavity is positioned between the insertion opening and the heating chamber.

8. The aerosol generation device according to claim 4, wherein the image detector is positioned below the insertion opening when the aerosol generation device is held such that an insertion direction of the aerosol generation carrier is from top to bottom.

9. The aerosol generation device according to claim 1, wherein the aerosol generation device comprises a closure, the closure being configured to move between a closing position of the insertion opening and an opening position of the insertion opening, and wherein the optical detection unit is configured to be activated when:
   (i) the closure is moved from the closing position to the opening position;
   (ii) the closure is moved from either the closing position or the opening position to an activation position; and/or
   (iii) the aerosol generation carrier is maximally inserted to the heating chamber.

10. The aerosol generation device according to claim 9, wherein the optical detection unit is activated by manually actuating the closure of the aerosol generation device.

11. The aerosol generation device according to claim 9, wherein the optical detection unit is activated for a predetermined time after the closure is moved to the activation position or the opening position.

12. The aerosol generation device according to claim 9, wherein the optical aperture is positioned in a front end of the closure.

13. The aerosol generation device according to claim 9, wherein the closure is configured to cover the optical aperture when the closure is in the closing position, and wherein the closure is configured to expose the optical aperture to the section of the second portion the aerosol generation carrier where the code is provided when the closure is moved to the opening position.

14. The aerosol generation claim 9, wherein the optical detection unit is activated when the closure is moved so as to trigger a Hall sensor, a tact switch, an infrared or proximity sensor, or an electrical contact sensor.

15. The aerosol generation device according to claim 1, wherein the aerosol generation device is configured to, based on an image detected by the optical detection unit: (i) identify and/or authenticate the aerosol generation carrier; (ii) carry out a program of a data retrieval protocol; and/or (iii) set a device setting; wherein the image detector is a camera.

16. The aerosol generation device according to claim 1, wherein the heating chamber is configured to be activated to heat the aerosol generation carrier after the code has been processed by the aerosol generation device.

17. The aerosol generation device according to claim 1, wherein the heating chamber is configured to stop heating the aerosol generation carrier after the aerosol generation device has sent an instruction to the heating chamber and based on processing the code.

18. The aerosol generation device according to claim 1, wherein the optical aperture is separated from the heating chamber by a heat insulating collar.

19. The aerosol generation device according to claim 1, wherein the optical aperture is positioned at an outer surface of the device, outside the insertion opening.

20. A system comprising: an aerosol generation device according to claim 1; and an aerosol generation carrier on which the code is provided, wherein the code is located outside of the heating chamber of the aerosol generation device when the aerosol generation carrier is maximally inserted into the insertion opening.

21. An aerosol generation device, comprising:
a casing defining an insertion opening for insertion of an aerosol generation carrier;
a heating chamber configured to partially contain a first portion of the aerosol generation carrier such that at least a second portion of the aerosol generation carrier extends outside the heating chamber, the heating chamber configured to heat the first portion of the aerosol generation carrier inserted in the heating chamber; and
an optical detection unit comprising an image detector arranged for optically detecting a code provided on a section of a surface of the second portion of the aerosol generation carrier extending outside the heating chamber,
wherein the optical detection unit is configured to receive light through an optical aperture formed in a component of the aerosol generation device, the optical aperture being located outside the heating chamber, and
wherein the optical aperture is positioned at an outer surface of the casing, outside the insertion opening.

* * * * *